US008892496B2

(12) United States Patent
Yao et al.

(10) Patent No.: US 8,892,496 B2
(45) Date of Patent: Nov. 18, 2014

(54) FUZZY INFERENCE APPARATUS AND METHODS, SYSTEMS AND APPARATUSES USING SUCH INFERENCE APPARATUS

(75) Inventors: Liqun Yao, Groby (GB); Da-Wei Gu, Leicester (GB); Ian Postlethwaite, Newcastle upon Tyne (GB)

(73) Assignees: University of Leicester, Leicester (GB); BAE Systems PLC, London (GB)

( * ) Notice: Subject to any disclaimer, the term of this patent is extended or adjusted under 35 U.S.C. 154(b) by 341 days.

(21) Appl. No.: 13/391,206

(22) PCT Filed: Aug. 19, 2010

(86) PCT No.: PCT/GB2010/051376
§ 371 (c)(1),
(2), (4) Date: Aug. 6, 2012

(87) PCT Pub. No.: WO2011/021044
PCT Pub. Date: Feb. 24, 2011

(65) Prior Publication Data
US 2013/0080376 A1    Mar. 28, 2013

(30) Foreign Application Priority Data
Aug. 19, 2009    (EP) .................................... 09168221

(51) Int. Cl.
*G06N 3/04*    (2006.01)
*G06N 7/02*    (2006.01)

(52) U.S. Cl.
CPC ................ *G06N 7/02* (2013.01); *G06N 3/0436* (2013.01); *G06N 7/023* (2013.01)
USPC .............................................. 706/52; 706/45

(58) Field of Classification Search
None
See application file for complete search history.

(56) References Cited

U.S. PATENT DOCUMENTS

| 5,414,645 | A | 5/1995 | Hirano |
| 5,719,999 | A | 2/1998 | Nishidai et al. |
| 5,740,323 | A | 4/1998 | Nomura et al. |
| 5,919,267 | A | 7/1999 | Urnes et al. |
| 6,556,951 | B1 * | 4/2003 | Deleo et al. ................... 702/183 |
| 2002/0165841 | A1 | 11/2002 | Quaile |
| 2003/0065632 | A1 | 4/2003 | Hubey |

(Continued)

FOREIGN PATENT DOCUMENTS

| EP | 1 085 460 A2 | 3/2001 |
| JP | 4-171536 A | 6/1992 |

OTHER PUBLICATIONS

Dixon, et al., Automation Reliability in Unmanned Aerial Vehicle Control: A Reliance-Compliance Model of Automation Dependence in High Workload, Human Factors, vol. 48, No. 3, Fall 2006, pp. 474-486.*

(Continued)

*Primary Examiner* — Wilbert L Starks
(74) *Attorney, Agent, or Firm* — Maine Cernota & Rardin

(57) ABSTRACT

A health monitoring system for complex networked apparatus includes a number of neuro-fuzzy inference apparatuses feeding inference results into a data fusion hierarchy. At each level in the hierarchy, fuzzy inference is applied to generate a desired output signal by processing selected input signals in accordance with a knowledge base defining fuzzy membership functions and fuzzy inference rules defined in advance. The knowledge base includes alternative definitions of membership functions and/or inference rules. The apparatus selects which definition to use according to environmental or other conditions, and predetermined selection criteria.

28 Claims, 10 Drawing Sheets

(56) References Cited

U.S. PATENT DOCUMENTS

| | | |
|---|---|---|
| 2005/0065753 A1 | 3/2005 | Bigus et al. |
| 2006/0218108 A1 | 9/2006 | Panfilov et al. |
| 2011/0166716 A9 | 7/2011 | Rovnyak et al. |

OTHER PUBLICATIONS

International Search Report (PCT/ISA/210) issued on Dec. 16, 2010 for International Application No. PCT/GB2010/051378.

Written Opinion (PCT/ISA/237) issued on Dec. 16, 2010 for International Application No. PCT/GB2010/051378.

International Preliminary Report on Patentability (PCT/IB373) issued on Feb. 21, 2012 for International Application No. PCT/GB2010/051378.

European Search Report (EPO Form 1503) issued Feb. 8, 2010.

International Search Report (PCT/ISA/210) issued on Oct. 5, 2010 for International Application No. PCT/GB2010/051376.

Written Opinion (PCT/ISA/237) issued on Oct. 5, 2010 for International Application No. PCT/GB2010/051376.

International Preliminary Report on Patentability (PCT/IB373) issued on Feb. 21, 2012 for International Application No. PCT/GB2010/051376.

European Search Report (EPO Form 1503) issued Feb. 16, 2010.

Patents Act 1977, Search Report under Section 17(6), issued Jan. 8, 2010.

Patent Act 1977, Search Report under Section 17, issued Dec. 22, 2009.

Gegov, "Complexity Management in Fuzzy Systems", Studies in Fuzziness and Soft Computing Springer, Dec. 31, 2007, pp. 42-43.

Hu et al., "Handbook of Neural Network Signal Processing", The Electrical Engineering and Applied Processing series—CRC Press, Dec. 31, 2002, 384 pages.

Wang, "An Intelligent System for Machinery Condition Monitoring", IEEE Transactions on Fuzzy Systems, IEEE Service Center, Piscataway, NJ, US, vol. 16, No. 1, Feb. 1, 2008, 14, pp. 110-122.

Jang, "Anfis: Adaptive-Network-Based Fuzzy Inference System", IEEE Transactions on Systems, Man and Cybernetics, IEEE Inc., New York, US, vol. 23, No. 3, May 1, 1993, pp. 665-684.

Mihai, "Using a Hidden Mathematical Model Generated by Input-Output Data. The Reliability of a Neuro-Fuzzy Controller for a Servodrive", Proceedings of the $8^{th}$ WSEAS Conference on Mathematical Methods and Computational Technique in Electrical Engineering, Oct. 17, 2006, pp. 288-293.

Kim et al., "A New Fuzzy Adaptive Controller Using a Robust Property of Fuzzy Controller", Intelligent Robots and Systems '93, IROS '93. Proceedings of the 1993 IEIEE/RSJ International Conference on Yokohama, Japan, Jul. 1993, New York, NY, USA, vol. 2, 5 pages.

Lavrov. "Modular Reconfigurable Controllers With Fuzzy-Meta-Control", Fuzzy Systems, IEEE World Congress on Computational Intelligence Proceedings of the Third IEEE Conference on Orlando, FL, USA, Jun. 1994, pp. 1564-1567.

Raju et al., "Adaptive Hierarchical Fuzzy Controller", IEEE Transactions on Systems, Man and Cybernetics, IEEE Inc., New York, US, vol. 23, No. 4, Jul. 1, 1993, 6 pages.

Li et al., "Self-Organizing Neuro-Fuzzy System for Control of Unknown Plants", IEEE Transactions on Fuzzy Systems, IEEE, Service Center, Piscataway, NJ, US, vol. 11, No. 1, Feb. 1, 2003, 16 pages.

Aja-Fenandez et al., "Fast Inference in SAM Fuzzy Systems Using Transition Matrices", IEEE Transactions on Fuzzy Systems, vol. 12, No. 2, Apr. 2004, pp. 170-182.

Browne et al., "Knowledge-elicitation and data-mining: fusing human and industrial plant information", Science Direct, Engineering Applications of Artificial Intelligence 19, 2006, pp. 345-359.

Yao et al., "Design, implementation and testing of an intelligent knowledge-based system for the supervisory control of a hot rolling mill,", Science Direct, Journal of Process Control 15, 2005, pp. 615-628.

"Formal Simplification of Fuzzy Rule Bases Systems", 56 pages.

Taur et al., "Hierarchical Fuzzy Neural Networks for Pattern Classification", 37 pages.

Office Action issued by the U.S. Patent and Trademark Office in the U.S. Appl. No. 13/391,072, mailed Dec. 30, 2013, U.S. Patent and Trademark Office, Alexandria, VA. (14 pages).

\* cited by examiner

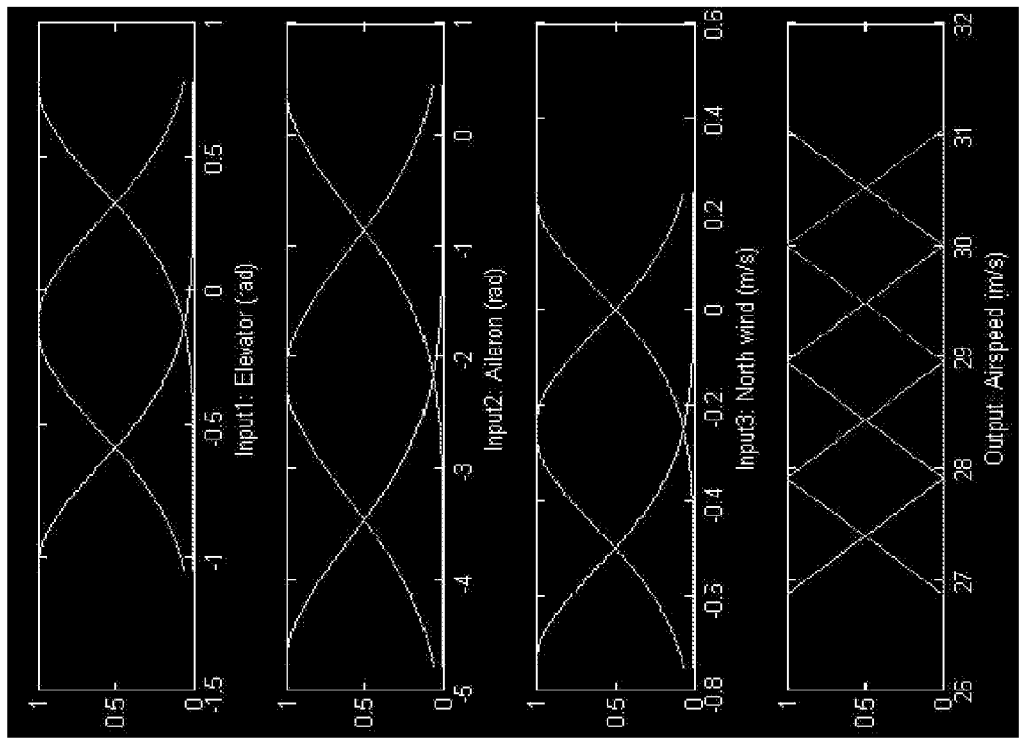
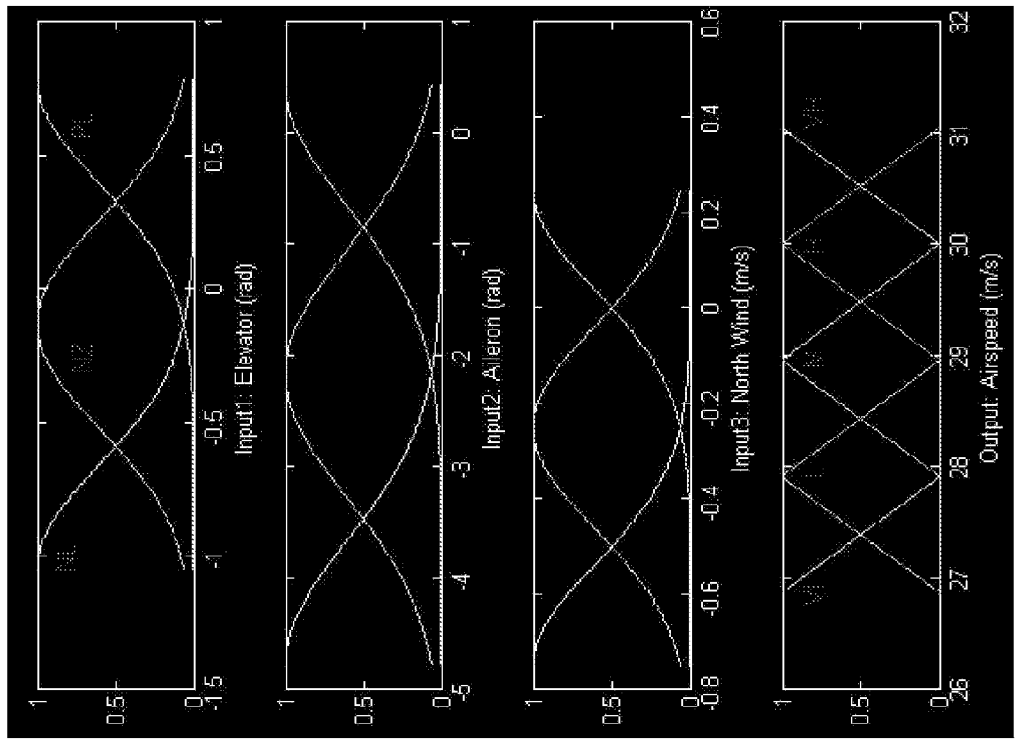
FIG. 9(b)
FIG. 9(a)

US 8,892,496 B2

FUZZY INFERENCE APPARATUS AND METHODS, SYSTEMS AND APPARATUSES USING SUCH INFERENCE APPARATUS

RELATED APPLICATIONS

This application is a national phase application filed under 35 USC §371 of PCT Application No. PCT/GB2010/051376 with an International filing date of Aug. 19, 2010 which claims priority of EP Patent Application 09168221.1 filed Aug. 19, 2009. Each of these applications is herein incorporated by reference in its entirety for all purposes.

FIELD OF THE INVENTION

The invention relates to fuzzy inference apparatus, particularly to techniques for reducing complexity in neuro-fuzzy inference systems, to allow real-time fuzzy operations in complex systems and hierarchies of systems.

BACKGROUND OF THE INVENTION

An example of an application for neuro-fuzzy inference apparatus is in the automation of health management (HM) in a complex system, in particular among a "system of systems" having network enabled capability (NEC). Monitoring such systems effectively is a difficult task, due to the large numbers of sensors, actuators and entities along with the uncertainty of the environment. A monitoring and diagnostic capability integrated with prognostics developments will enable the provision of: 1) real-time support of highly integrated NEC systems; 2) management of uncertainty/change in an NEC environment; 3) expert (human) knowledge for HM; and 4) real-time monitoring information associated with the health of system-of-systems (SoS) to assist human decision-making. Health management focuses on the reliable detection and monitoring of faults and failures of distributed assets. A degree of diagnostic capability already exists at the component level. The main challenge is to bring health management to different levels across a distributed system, as in NEC, thereby enabling major improvements in supportability and reconfiguration.

System diagnosis is an important part of HM systems. Diagnostics provide health information for use in prognostics, reconfiguration and decision-making functions. In recent years, a class of artificial intelligent (AI) technologies has been introduced to help engineers deal with large-scale complex network enabled systems in uncertain environments. Neuro-fuzzy inference (NFI) systems are possibly the best tools available for accounting for qualitative aspects of complexity such as the uncertainty of the environment and are well suited for decision making tasks. NFI systems combine expert knowledge and learning in a hybrid approach. Examples of such techniques applied to industrial plant control applications are described for example in "Knowledge-elicitation and data-mining: Fusing human and industrial plant information" by W. Browne, L. Yao, I. Postlethwaite, S. Lowes, M. Mar, Engineering Applications of Artificial Intelligence 19 (2006) 345-359 and in "Design, implementation and testing of an intelligent knowledge-based system for the supervisory control of a hot rolling mill" by L. Yao, I. Postlethwaite, W. Browne, D. Gu, M. Mar, S. Lowes, Journal of Process Control 15 (2005) 615-628. Both papers are published by Elsevier.

However, in the NEC environment, the associated NFI operations in the fuzzification, the inference and the defuzzification stages increase the quantitative complexity of the problem; the quantitative complexity of problems increases the number of rules in the NFI system, when the number of inputs gets bigger.

SUMMARY OF THE INVENTION

The invention has as its object to enable the provision of monitoring systems for complex systems of entities such as networked 'system of systems' while managing the complexity and processing power required for the design and/or implementation of such monitoring, in real time.

The invention in a first aspect provides a fuzzy inference apparatus comprising:
  a plurality of inputs for receiving time-varying input signals;
  at least one output for outputting a time-varying output signal dependent on the input signals;
  processing apparatus for performing fuzzy inference to generate said output signal by processing the input signals in accordance with a knowledge base defining fuzzy membership functions and fuzzy inference rules defined in advance;
  wherein said knowledge base comprises at least two alternative definitions of said membership functions and/or inference rules, and the processing apparatus is operable to apply different ones of said definitions at different times.

By providing the ability to switch between different knowledge bases, the apparatus can be designed to handle a wider range of conditions overall, without increasing complexity or sacrificing accuracy or precision of the inference results. The knowledge base in a typical embodiment contains fuzzy membership functions for input and output variables, and a set of rules (rule base).

The apparatus may include a selector for selecting which definition to use automatically in response to selection criteria specifying ranges of operating conditions in which each definition may be used. The selector may be designed to apply hysteresis, time delays or other protocols for preventing excessive switching between definitions.

The selection criteria may define ranges of operating conditions by reference to externally received signals, to certain of the input signals already received as inputs or to combinations of these.

The apparatus may be responsive to an externally supplied selection signal, commanding the application of a particular definition.

The apparatus may be responsive to a selection value loaded into memory prior to operation.

The processing apparatus may be arranged to optimise its fuzzy rule set automatically during operation, between fuzzification of the input signals and completion of the fuzzy inference. Live or 'online' optimisation can reduce the computational burden.

The processing apparatus may be arranged for example to perform optimisation of non-monotonic rules. One such process allows a number of rules proportional to the number of inputs times the number of linguistic values of the output signal to be evaluated, and then reduced to a smaller number of dominant rules equal to the number of linguistic values of the output signal prior to defuzzification. The need to aggregate and defuzzify the results from a much smaller number of dominant rules greatly reduces the computational burden.

The inference apparatus may form part of a monitoring system for another apparatus, the output signal representing a measure of health of the monitored apparatus. The inference apparatus and the monitored apparatus may be housed together as one unit, together with a communications interface for delivering said output signal via the communications interface to a remote apparatus.

The inference apparatus in that case may be part of a larger monitoring system for a plurality of monitored apparatuses, said remote apparatus comprising further processing apparatus for receiving and aggregating output signals generated by similar inference apparatuses to obtain a measure of the health of the monitored apparatuses as a group.

The input signals may include signals obtained from sensors and subsystems located within said unit, and/or they may include signals received over a communications interface from other units.

The input signals may include a signal that is the output signal of a subsidiary inference apparatus in a hierarchical reporting structure. The subsidiary inference apparatus may include alternative definitions of its own membership functions and/or inference rules, and may be arranged to apply different definitions at different times to generate its own output signal.

The processing apparatus may be arranged to perform said fuzzy inference by vectorised processing of fuzzy input values and rule data in an array form. This is described more fully in a parallel application filed concurrently herewith.

The invention in the first aspect further provides a method of programming an inference apparatus of the type set forth above, wherein said definitions of membership functions and rules are generated by a training process, for example a neuro-fuzzy training process, each definition being obtained from training with a sample data set restricted or biased to the range of conditions for which the particular definition will be selected.

The programming of the inference apparatus may include transformation of the fuzzy rule base to reduce complexity, before or after training. In a preferred embodiment, each fuzzy inference apparatus is dedicated to production of a single output value (MISO architecture) and by a single rule base (SRB). Automated optimisation processes are known by which these forms of apparatus can be obtained, even starting from a rule base that does not comply. Alternatively, especially for monitoring lower level functions, the designer may be able to design the rules in MISO-SRB form from the outset.

The invention in the first aspect further provides a method of generating a time-varying output signal in response to a plurality of time-varying input signals, the method comprising:
(a) storing in a processing apparatus a knowledge base comprising definitions of membership functions for said input and output signals and inference rules for use in fuzzy inference processing;
(b) receiving said input signals; and
(c) operating said processing apparatus to generate said time-varying output signal by performing fuzzy inference processing of the input signals repeatedly in accordance with the membership functions and rules stored in the knowledge base,
    wherein step (a) includes storing a plurality of alternative definitions of at least some of said membership functions and/or inference rules, and step (c) includes making a selection between said alternative definitions so as to perform said inference processing using different definitions at different times.

The step (a) may further include storing selection criteria specifying ranges of operating conditions in which each definition should be used, the selection in step (c) then being made automatically in response to changes detected in operating conditions.

The selection criteria may define ranges of operating conditions by reference to externally received signals, to certain of the input signals already received as inputs or to combinations of these.

The selection may be made in response to an externally supplied selection signal, commanding the application of a particular definition.

The selection may be made by a selection value loaded into memory prior to operation.

Optimisation may be applied as described above with reference to the apparatus of the first aspect.

The step (a) may include generating said knowledge base by a training process using a training data (pre-recorded from real measurements or synthesized) representing potential input signals and desired output signals, the different definitions being the result of training using different subsets of the training data. The subsets of training data for different definitions may overlap.

The method may be performed as part of operating a monitoring system for another apparatus, again as described above. The method may be performed as part of a larger monitoring system for a plurality of monitored apparatuses, including operation in a hierarchy to obtain a measure of the health of a monitored system.

The method may be applied in monitoring or in control applications. The method may be applied in remote monitoring the condition of an unmanned vehicle.

The invention in the first aspect further provides a computer program product containing instructions for causing a programmable processing apparatus to implement a fuzzy inference processing apparatus or method as set forth above. The computer program product may further comprise said knowledge base including said alternative definitions. The knowledge base may further comprise selection criteria to be applied automatically for selection of definitions to be applied in operation.

The invention in a second aspect provides a distributed data processing system for monitoring the condition of a system of discrete apparatuses over time, the monitoring system comprising a hierarchy in which a higher level monitoring apparatus is supplied with input signals from a plurality of lower level monitoring apparatus, each lower level monitoring apparatus comprising one or more fuzzy inference processor for processing a plurality of input signals relating to its respective monitored apparatus and for generating an output signal representing the condition of its monitored apparatus, the higher level monitoring apparatus comprising at least one fuzzy inference processor for receiving as inputs the output signals of plural lower level monitoring apparatuses, and for generating a higher level output signal representing the condition of the system of discrete apparatuses as a whole.

The invention in the second aspect further provides an automated method of distributed data processing for monitoring the condition of a system of discrete apparatuses over time, the method comprising:
    establishing and operating a hierarchy of monitoring apparatuses in which a higher level monitoring apparatus is supplied with input signals from a plurality of lower level monitoring apparatus,
    in each lower level monitoring apparatus operating one or more fuzzy inference processors to process a plurality of input signals relating to its respective monitored apparatus and generate an output signal representing the condition of its monitored apparatus, in the higher level monitoring apparatus operating at least one fuzzy inference processor to receive as inputs the output signals of plural lower level monitoring apparatuses, and to generate a higher level output signal representing the condition of the system of discrete apparatuses as a whole.

This hierarchy of monitoring apparatuses, with one level processing as its inputs a plurality outputs from a lower level, may be referred to as a data or information fusion system, appropriate to manage the complexity (and hence data processing burden) of health monitoring or other types of monitoring in a system of apparatuses.

The hierarchy may have more than two levels, and fuzzy inference may be applied at more than two levels. The first and second aspects can be used in combination, such that some or all of the monitoring apparatuses at one or more in the hierarchy have the features of alternative definitions to be applied in different conditions.

These and other aspects, optional features and advantages of the invention will be apparent to the skilled reader, from consideration of the drawings and description of embodiments which follow.

BRIEF DESCRIPTION OF THE DRAWINGS

Embodiments of the invention will now be described, by way of example only, by reference to the accompanying drawings, in which:

FIG. 9 illustrates (a) initial and (b) final fuzzy membership functions in the example application, trained for a "good weather" condition.

DETAILED DESCRIPTION OF THE EMBODIMENTS

Introduction

Figure 1:
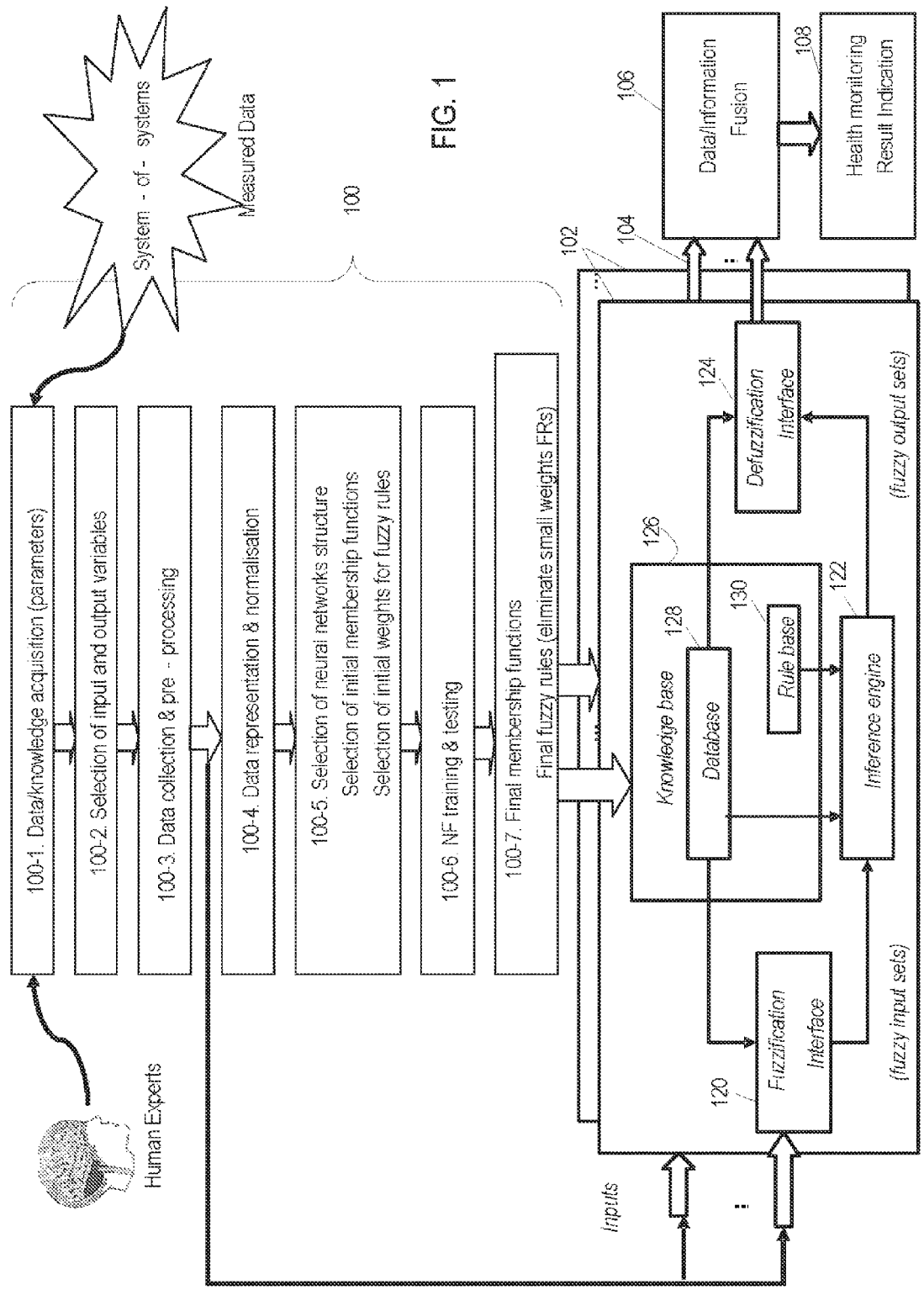
FIG. 1 is an overview of the process and architecture of a complex apparatus for monitoring the condition of a "system or systems"

The invention, though generally applicable, will be described in the context of an application example, particularly a "health" monitoring (HM) system for complex networked systems. Such a "system of systems" involves co-operation between a number of individual entities, each having a high degree of autonomy, and each in itself being a complex combination of subsystems, components etc. The systems within the larger system share some information through a network (shared access network, SAN), while other information is local to the entities, or subsystems within them. Health monitoring may be applied of course to the components of a communications network in itself, as well as a system of functional entities that happen to use a network.

The structure of the health management (HM) system can thus be divided into three hierarchical levels:

High level: Integrated monitoring and diagnosis in network-enabled capability (NEC) environments. For example, the entities collaborate in a mission using the following information: mission failures/changes/reconfiguration/requirements, mission execution time, mission prospects, loss of vehicles, etc.

Mid level: System detection and diagnosis on each entity. For example, entity sensor failures, system or subsystem failures.

Low level: Physical failures—sensors and actuators on each entity. For example, plant and actuator failures.

The HM system varies widely with many different approaches to diagnosis. The challenges include determining the right diagnostic technology or the best combination of technologies for the appropriate level in an HM system in an NEC environment. For example, at the level of individual circuits and components, direct sensors outputting a "good" versus "fail" status can be implemented relatively directly. As one moves up through the hierarchy to subsystems, complete entities, and to the system-of-systems itself, however, the sheer quantity of underlying information is too great to be processed directly. Therefore a degree of aggregation and filtering of the data is performed at each level, with more generalized results being passed to the next level. In these levels, the inventors have identified that fuzzy inference is particularly useful to reduce the volume of data, and particularly neuro-fuzzy inference, based on fuzzy membership functions and inference rules learned in a training environment are the best approach to make the problem manageable.

Using neuro-fuzzy inference (NFI) technology to develop a monitoring and diagnostic capability for health management in complex networks has the potential to integrate human knowledge into a knowledge-base for the mid and high levels of the HM system. This potential can only be realized, however, when the problem of complexity is addressed. Otherwise, the computation complexity of the task will prevent its real-time implementation, and so render it useless for a real system.

Adaptive NFI systems and Hybrid NFI systems are the two most popular NFI systems that simulate a Sugeno type fuzzy inference system (FIS) and a Mamdani type FIS respectively. In Mamdani type FIS the output membership function can be defined independent of the inputs while in Sugeno type FIS each output function is a function of the inputs. It is clear that Sugeno type FIS is efficient for function approximation problems but is not appropriate for diagnosis applications and knowledge (rules), whereas, Mamdani type FIS is universally applicable and can be used for diagnosis applications. A Mamdani type NFI system is therefore used in HM.

A Mamdani type rule is given, for example, by:

"IF x1 is low AND x2 is medium THEN y is high"

The input variables x1 and x2 may be received for example from sensors, from combinations of sensors, or from inferences performed at a lower level in the hierarchy. The linguistic values (LVs) "low", "medium", "high" are characteristic of fuzzy logic, and represent ranges of values for each variable, defined by fuzzy membership functions (MFs). It is assumed that the reader is familiar with fuzzy logic systems generally. If not, the examples described further below will help to illustrate the fuzzy inference in practice.

HM System Architecture

A generalized schematic structure of the novel health management system is shown in FIG. 1. As in conventional NFI systems, the system operates in a set-up or "offline" phase 100, which then enables the configuration of real-time inference modules 102 during actual operation. The system as a whole can be implemented as a mixture of hardware and software. In the offline processing steps 100, particularly the initial steps, to be described below, human intervention may be involved as part of the capture of expert knowledge. In the online processing 102, the system can be made autonomous to any desired degree. The offline processing is likely to be implemented with high-performance computing hardware and software based on established mathematical and simulation toolkits. The online processing modules 102 may also be implemented by suitable software and data structures, running on processing hardware onboard the vehicle of other entity or in a central control facility, depending on the level of the hierarchy at which the modules 102 are to be used. For the example of the HM system for a network enabled system of autonomous vehicles, it is assumed that modules 102 are running on an entity such as an autonomous vehicle, and their outputs 104 are combined by a data/information fusion module 106, constituting the next higher level in a hierarchy. Eventually, at 108, the result indications of the health monitoring process are delivered to a decision-making entity and/or data recording system, which may be human operated or a further automated decision-making apparatus.

Offline Processing Steps

The offline data processing system 100 has seven modules to support the offline data processing:

100-1) Data/knowledge acquisition;
100-2) Selection of input and output variables;
100-3) Data collection and pre-processing;
100-4) Data representation and normalization;
100-5) Selection of neural network structure, initial membership functions and initial weights for fuzzy rules;
100-6) NF training and testing;
100-7) Final membership functions and final fuzzy rules (after eliminating small weighted fuzzy rules). The final membership functions and fuzzy rules are sent to the knowledge base of the online NFI systems 102 for the online reasoning.

The "neuro" part of the neuro-fuzzy inference system is implemented by the adaptive learning of the fuzzy membership functions and rules, during the off line processing stage 100-6. As is well known, during such learning, the prototype fuzzy inference system is defined, using human expert knowledge, by initial membership functions and initial weights for fuzzy rules. This inference system is then exposed to real-world or simulation data on an iterative basis, the membership functions and rules being adjusted incrementally to maximize agreement between measured values and output of the fuzzy inference.

Conventionally, such training would be performed with sets of data representing all the expected operating conditions for the apparatus, to ensure that the fuzzy inference can respond appropriately in all circumstances. Toolkits for implementation and training of fuzzy systems are available in development and research tools such as MATLAB®, and need not be detailed here. A novel feature in the present apparatus, however, is the facility to adapt the membership functions and rule bases to different operating conditions at different times. This will be described in more detail below with reference to FIGS. 2 and 3.

Online Processing

Referring to online processing modules 102 of FIG. 1, each comprises a fuzzification interface 120, an inference engine 122 and a defuzzification interface 124. These are generic modules, whether implemented in hardware or, nowadays more likely, software sub-modules. The special adaptation of the fuzzy inference to its given task is stored in a knowledge base 126, which contains a database 128 of membership functions (MFs) for the fuzzification and defuzzification interfaces 120, 124, as well as the rule base 130 by which the inference engine 122 can apply an inference and deduce an appropriate fuzzy output set for the input conditions. The knowledge base in practice can be represented by a matrix or table of values, of a type that will be illustrated later.

Real Time Selection of Fuzzy Rules

Figure 2:
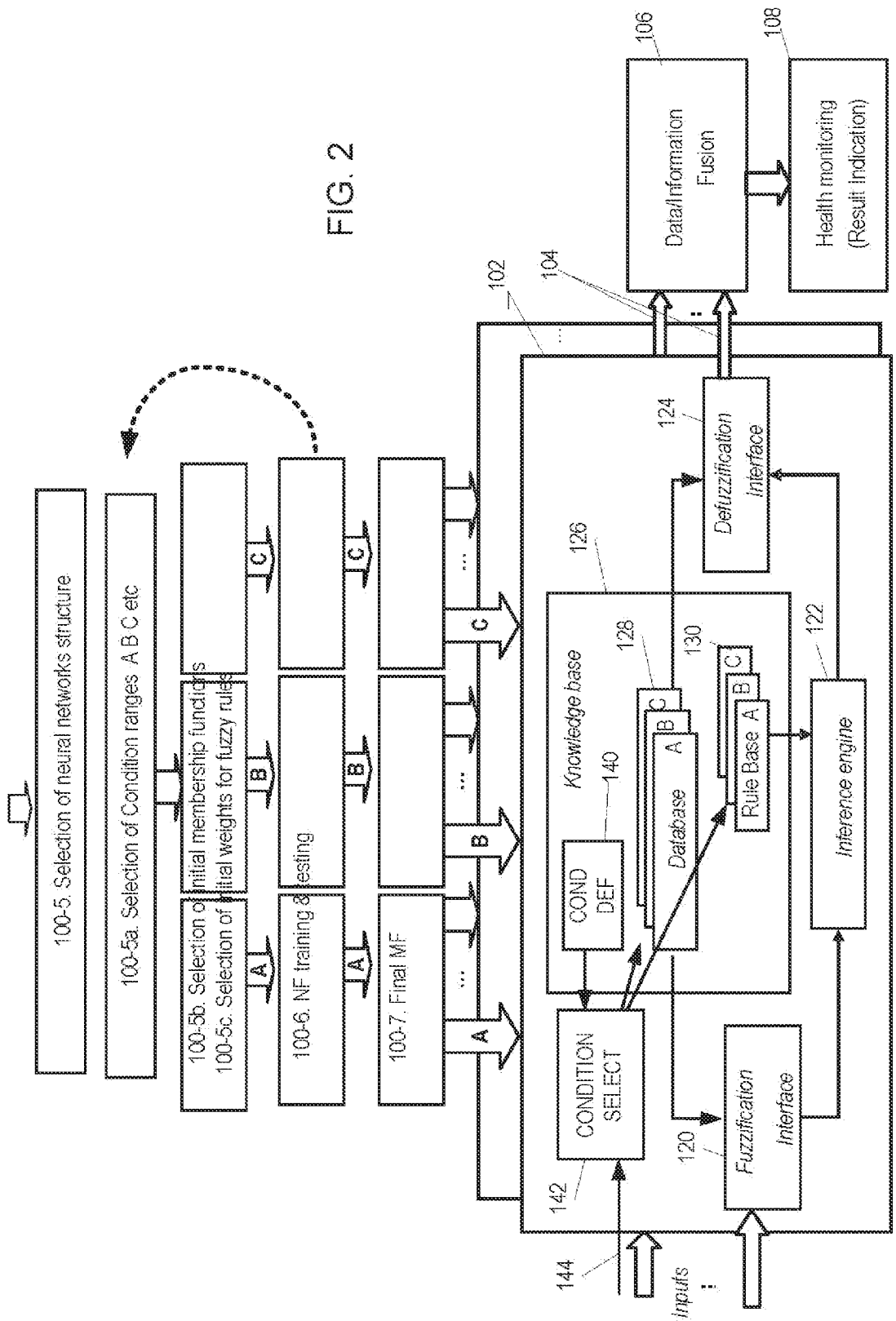
FIG. 2 illustrates in more detail a condition-selected rule base implemented in the system of FIG. 1 to reduce complexity of a fuzzy inference.

Referring now to FIG. 2, we see expanded the latter steps of the offline and online processing that are applied in the novel system. In real systems which are exposed to widely varying conditions, the inventors have recognized that the optimal rule set that may be obtained from training across that wide range of conditions will likely result in a rule set that is far from ideal for any condition. Further, complexity is increased because the fuzzy inference requires a large number of linguistic values to cover the full range of an input variable with sufficient precision. Rather than try to cover all conditions in a single rule set, the inventors propose that the ranges of conditions experienced by the system are sub-divided into a plurality of condition ranges or regimes and training is performed separately for these, using appropriate subsets of the available training data.

Accordingly, in step 100-5 of FIG. 2, expanded from that shown in FIG. 1, we see that a preliminary step 100-5a is performed to identify certain condition ranges or regimes A, B, C. This separate treatment of regimes A, B, C in practice will extend throughout the earlier steps 100-1 to 100-4. The ranges can be defined by human observation and expert design from the outset, and/or semi-automatically by observing tensions arising in initial training across all conditions. As a simple example, appropriate to the field of unmanned aircraft, the weather conditions may be divided into two regimes: 'bad weather' (strong winds) versus 'good weather' (light winds). To obtain a rule base appropriate to both types of condition is a challenge, particularly if one is going to want to compress the rulebase later in a challenging real-time application. As indicated by the labels A, B, C, the concept of condition regimes is adaptable to any type of application, however, and the number of ranges may be two, three or more.

In step 100-5b and 100-5c, initial membership functions and rule weightings are selected for each regime A, B and C, typically based on expert input. The initial MFs and rules may be identical for the different regimes. If expert knowledge is available, however, training will be faster if initial values suitable to the individual regime are input.

In training step 100-6, training of the NF networks is performed using data sets/simulations which are selected to match the desired regime. In other words, if regime A represents bad weather, data gathered or simulated under good weather conditions are excluded from the training data. In practice, they may not be excluded completely, but rather minimised or de-weighted to allow the bad weather experience to dominate. After training, step 100-7 records, for each regime separately, the final membership functions, rule weightings and so forth. As an option, indicated by the broken curved arrow, experience in the learning step can be used to re-evaluate the definitions of the condition regimes themselves, and the process repeated.

In the online processing modules 102, the fuzzy inference knowledge base now contains plural databases of membership functions 128A, B, C and rule bases 130A, B, C, in a number corresponding to the different training regimes A, B, C. The knowledge base 126 further comprises condition definition data 140, which encodes rules for determining, from current operating conditions, which regime A, B or C actually applies. This data is defined in steps 100-3 modified if appropriate through steps 100-4, 100-5 and so on. A condition regime selector 142 uses this definition data as a reference against which to compare current input data 144, and selects a current regime in real time. The data 128A, B, C and 130A, B, C for the current regime is then selected as the data which is loaded into fuzzification interface, 120, inference engine 122 and defuzzification interface 124 for the performance of fuzzy inferences under current conditions.

The input data 144 on which the condition selection is made may comprise signals from among the existing inputs of the inference process, or some independent input. It may be derived from sensors directly and/or via human control. In the weather example, data 144 may be environmental data on prevailing conditions transmitted from off the vehicle. The data transmitted may be a wind speed measurement, for example, for comparison with thresholds encoded in the definition data 140, or it may be an explicit statement that regime A, B or whatever applies. In preferred embodiments of the invention, the regimes can be defined as a 'normal' regime and one or more 'anomaly' regimes. The vast majority of online operation will thus be conducted entirely in the 'normal' regime. Only in exceptional circumstances will the rules need to be switched to an 'anomaly' regime.

In any case, the ability for the fuzzy processing to adapt to different regimes in real time has important benefits in reducing the complexity, and speeding up the process time, as the example below will illustrate. The skilled reader will appreciate that care should be taken in designing the condition regimes and rule bases, as well as the conditions for effecting a transition between regimes in real time, in order that the benefits are not outweighed by drawbacks. The frequency at which the rules are changed should not be so high that it becomes substantial processing overhead, causes excessive downtime or causes 'noise' in the system output. Noise can be minimized by attention to consistency in the rule sets at the boundaries of the regimes. This will be assisted for example by including some overlap between the subsets of training data used for the different regimes in step 100-6. Note that continuity of outputs (absence of noise) is not so important in a health monitoring application as it would be in a control application, however.

The same process is performed, sequentially or in parallel, to load the knowledge base(s) of each of the online processing modules 102. As a consequence of optimization steps to be explained further below, each module is a single output (MISO) inference system. While a particular MISO module may include different regimes in the same manner as the one just described, the variation of operating conditions may affect the inference in a parallel module completely differently: each module 102 may thus have its own definitions of regimes, or may not need subdivision of regimes at all. Some modules can be designed to allow rapid reassessment of the applicable regime and frequent changes, while others will change only rarely.

Management of Complexity in NFI System

Having adopted the above real-time-switchable structure for the neuro-fuzzy inference, various measures can be applied to reduce complexity still further. The management of complexity in NFI systems relies on the basic properties of fuzzy rule bases. These properties reflect the extent to which linguistic values of inputs and outputs are available as well as the type of mapping between the linguistic values of the inputs and corresponding linguistic values of the outputs. The NFI system is mostly useful in modelling complex systems that can be observed by humans because it makes use of linguistic variables as its antecedents and consequents. These linguistic variables can be naturally represented by fuzzy sets and logical connectives of these sets.

Four main properties are usually required for the rule base: continuity, consistency, completeness, and monotonicity. The continuity guarantees that small variations of the input do not induce big variations in the output. Consistency means that if two or more rules are simultaneously fired their conclusions are coherent. Completeness means that for any possible input vector, at least one rule is fired; there is no inference breaking. Monotonicity means that every possible output vector is mapped from only one of the input vectors.

In the HM system, we consider managing and reducing the complexity broadly by three measures:

1) transforming formally the multiple rule base (MRB) system into an equivalent single rule base (SRB) system;
2) converting the multiple input and multiple output (MIMO) SRB system into an equivalent collection of MISO SRB systems; and
3) reducing the rules by an embedded (real time) optimizing algorithm in the SRB system to give an SRBO system.

These three measures are similar to what is described for example in the book "Complexity Management in Fuzzy Systems: A Rule Base Compression Approach" by Alexander Gegov, Springer, ISBN 978-3-540-38883-8 (Studies in Fuzziness and Soft Computing Volume 211). The basics of these methods therefore do not need to be described here in detail. Only brief outlines will be given.

These three steps, adapted and applied to the neuro-fuzzy inference apparatus of the present application, produce a simplified NFI model which we call NFI-SRBO-MISO. Each of the modules 102 in FIG. 1 implements a respective NFI-SRBO-MISO model. The NFI-SRBO-MISO model is not only capable of reducing the quantitative complexity in NFI systems, it can also speed up the operation of NFI systems for monitoring and diagnostics in real-time.

Regarding the first measure, an SRB system is characterized by the isolated nature of its rule base. An MRB system is a system with some interconnections between its rule bases. An MRB system can be viewed as a fuzzy rule base network whereby all rule bases in a row represent a level (as a temporal hierarchy) and in a column they represent a layer (as a spatial hierarchy). An MRB system with s levels and q layers can be represented by a matrix. The elements $RB_{i,j}$ of the matrix are rule bases, where $i=1, \ldots, s, j=1, \ldots, q$. MRB systems can be viewed as networks whose nodes are SRB systems and whose connections are feedback or feedforward links. Interconnections between the rule bases $RB_{i,j}$ must be given by specifying which output from which rule bases are which inputs to which rule bases. If an output from a rule base is fed back into an input to the same rule base, the interconnection is local; and if an output from a rule base is fed back into an input to another rule base residing in the same or in a different layer, the interconnection is global.

The operation and management of MRB systems is very complicated, and therefore formal methods have been developed to translate an MRB system definition to an equivalent SRB system. This will be done at the Data Collection and Pre-processing stage 100-2, 100-3, when required.

The second optimization step involves translating the rule base from one which describes a multi-output (MIMO) inference process into a set of individual rule bases, each defining a single output (MISO) inference process. This plurality of single output MISO processes is illustrated by the plurality of online processing modules 102 shown in FIG. 1, each having a respective output 104. These modules may operate by time sharing on a single processor, or by separate processors.

The third optimization step includes the optimization of non-monotonic rules (ONR) which is performed partly during the online operation and will be explained in more detail below.

Figure 3:
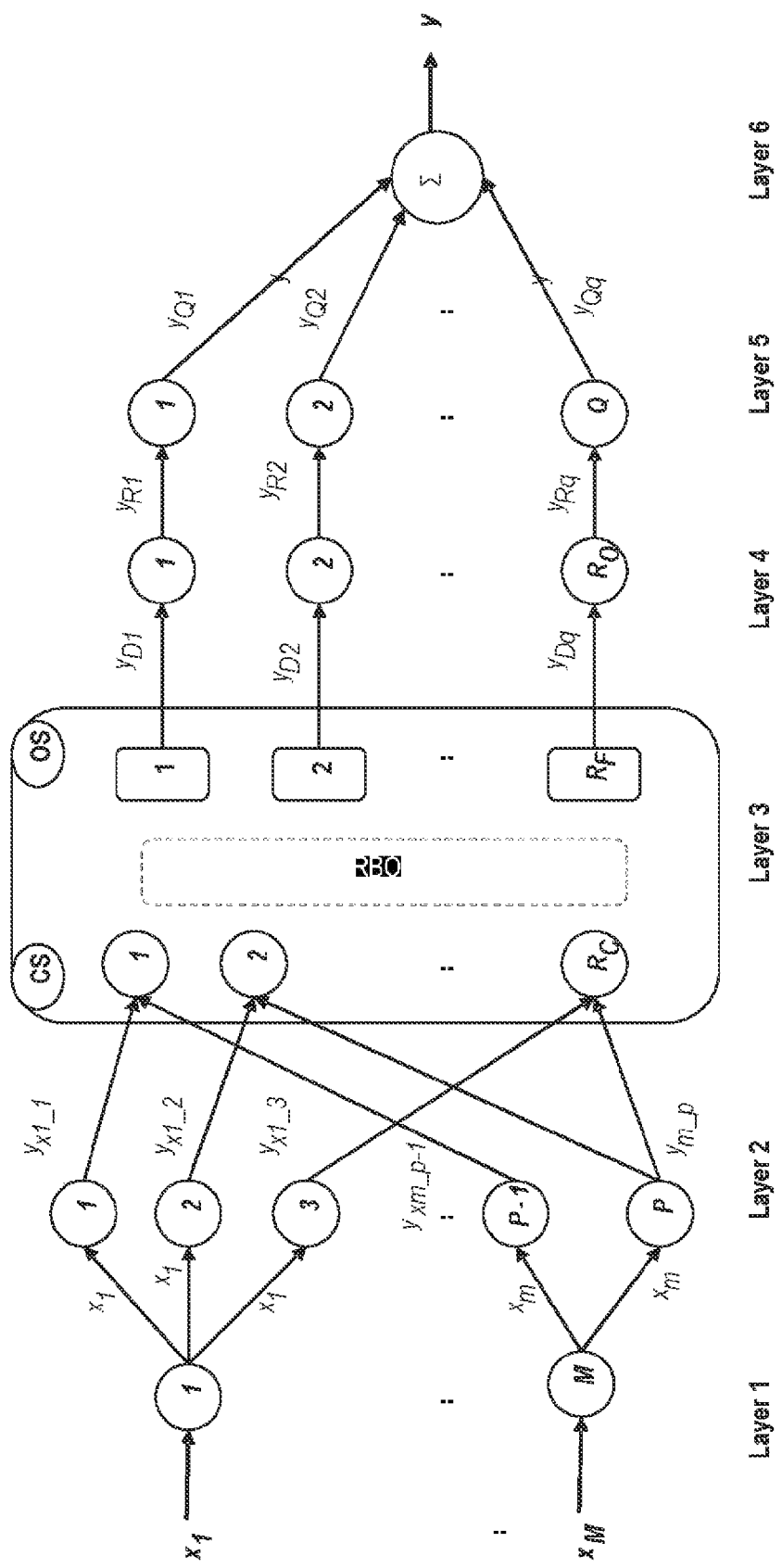
FIG. 3 is a diagram representing an optimizing neuro-fuzzy inference process applicable in the system of FIGS. 1 & 2.

FIG. 3 illustrates the NFI-SRBO-MISO model, implemented by one or other of the modules 120, 122, 124 in a module as illustrated in FIG. 2. The model has a total of six functional layers, described below.

Fuzzification Stage (Layer 1):

In Layer 1 the fuzzification comprises the process of transforming crisp values of inputs $x_1$ to $x_M$ into grades of membership of fuzzy sets, using for the first input the LVs $y_{x1\_1}$ to $y_{x1\_3}$, and similarly for the other inputs through to $y_{m\_1}$ to $y_{m\_p}$. The LVs may be the same for each input, representing for example Negative Large, Near Zero or Positive Large. The LVs appropriate to each variable and the names they are given, are a matter of design choice. In a neuro-fuzzy system, the membership functions applied are typically learned through training. (Learning could in principle be constrained by fixing the membership functions while learning the rule strengths, or vice versa.)

Inference Stage (Layers 2~5):

In Layer 2 the fuzzy membership degrees of the inputs in each rule are mapped onto a firing strength for this rule, which is based on Conjunction (min) fuzzy rule bases in a well-known manner.

In Layer 3 the ONR optimization is performed to remove redundancy by making the rule base monotonic. CS (conventional system) illustrates that there are $R_c$ rules in the fuzzy rule base without optimization, while OS (optimized system) represents the optimized system of only q rules, that is, one for each linguistic value of the output.

In Layer 4 (implication), in which the apparatus calculates the truncated fuzzy membership function for the output in each rule, again in a well-known manner.

Layer 5 (aggregation) maps the fuzzy membership functions for all rules in the optimized system onto an aggregated fuzzy membership function representing the combined output for all the rules.

Defuzzification Stage (Layer 6):

Layer 6 (defuzzification) maps the aggregated fuzzy membership function for an output in the system onto a crisp value for this output.

It is noted that the maximum number of rules in an NFI system R is an exponential function of the number of inputs m and number L of linguistic values (LVs) which each input can take: $R=L^m$. When the number of inputs or the number of LVs increases, it is not difficult to imagine that the number of rules will increase rapidly. The optimization of non-monotonic rules (ONR) arranges monotonic rules in groups and finds the dominant rule in each group. Monotonic rules have the same linguistic value for the output and are very common in fuzzy systems. The dominant rule is the one with the highest firing strength whereby all other rules from the group do not have any impact on the output.

The ONR algorithm guarantees that there will be only monotonic rules in a fuzzy rule base after completion of the optimizing process. In this case, the number of monotonic rules is equal to the number of different linguistic values of outputs. Therefore, the optimizing process can always be performed with full success, i.e. without any residual non-monotonicity being left. Applying ONR allows the information contained in a non-monotonic rule base of a fuzzy system to be compressed by removing the redundancy in the rule base. As a result, the size of the large non-monotonic rule base is reduced significantly in each simulation cycle and the reduced monotonic rule base is equivalent to the large non-monotonic rule base in terms of its behaviour.

When the NFI system with selectable condition regimes is combined with the ONR algorithm in the manner to be described below, the new system will further reduce the rule base and the quantitative complexity in NFI systems, without prejudice to performance.

As an example of the neural learning algorithm, the NFI system of the present example uses a hybrid learning algorithm that combines a least-squares estimator and the gradient descent method, that is a well-known first-order optimisation algorithm. Initial functions are assigned to each membership function (the input LVs for fuzzification in layer 2 and the output LVs for defuzzification in layer 6). Each function typically has a triangular or trapezoidal form with a centre (peak) and width/slope values. The function centres may be set for example so that the range of possible inputs is divided equally and the widths and slopes are set so that there is sufficient overlapping of functions.

Each rule has antecedent parts (conditions) and consequent parts (conclusions or results), expressed in terms of the LVs. After setting the initial functions for each LV, training then proceeds in a series of epochs, each epoch comprising a forward pass and a backward pass. In the forward pass, the desired set of training set of input patterns is presented to the NFI system and outputs are calculated layer by layer. Rule consequent parameters are identified by the least squares estimator. In the backward pass, a back-propagation algorithm is applied, in which the parameters of the antecedent membership functions are updated to minimise the error between the initial outputs and the desired outputs defined in the training set. This training can be repeated for a number of epochs until the membership functions are adequately settled. Human expert supervision can be applied also if desired.

In the optimization scheme presented above, neural learning is confined to the offline processing 100, while the ONR compression of the resulting rule base occur in simulated and real online operation. The on-line steps in the ONR algorithm reflect only one simulation cycle of a fuzzy system. In the case of more simulation cycles, all on-line steps must be applied for each new cycle. In this case, the computations for each MISO SRB system may be done in parallel, which will reduce the overall computational time.

In conclusion, the set-up and operation of the NFI system in the present example involves the following steps:

1. Data/knowledge acquisition: a) acquisition of task knowledge from the expert; b) acquisition of measured data for different ranges of conditions. For example, data gathered should include data from a perfect weather condition and a bad weather condition with a strong wind; data may be gathered from a real world apparatus or a simulation;
2. Selection of inputs and output variables;
3. Data collection & pre-processing: all data will be saved, pre-processing is based on the requirement of the mission from step 1; if necessary, the transformations from MIMO to MISO model and from MRB to SRB model are performed;

4. Selection of condition ranges for each output variable;
5. Data representation & normalization by selection of neural networks structure, initial membership functions and initial weights for fuzzy rules;
6. NF training and testing (using for example the Fuzzy toolbox in Matlab®), using different sets of measured data to train for different condition ranges;
7. Two or more of final MFs and FRs will be used for the NFI-SRBO-MISO model, each designated for a different condition regime;

On-line Optimization of Rule Base Systems (performed for each data point):

8. Select inputs and output variables from step 2 to set up as inputs and output of the NFI-SRBO-MISO model;
9. From the current conditions identify which regime A, B, etc. applies (for example good or bad weather condition)? This is known by measurement or by explicit status information provided from outside.
10. Select final MFs and FRs A, B, etc. depending on the condition regime;
11. Construct a matrix for the selected rule base system (RBS). The rows of the matrix can be represented by the rule number, linguistic values (LVs) of inputs, firing strength and LVs of output, the columns of the matrix content the values of the rule number, LVs of inputs firing strength and LVs of output. The rule number, the LVs of inputs and output are stored into the RBS matrix;
12. The fuzzification interface 120 maps the crisp value of each input to the system onto a fuzzy value by means of a fuzzy membership degree (FMD). This degree can be obtained from the MFs of the inputs to the fuzzy system. The parameters of the final MFs from step 10 used for the fuzzification of the input.
13. The inference engine 122 maps the FMD of the inputs in each FR from step 10 onto a firing strength for this rule, which is typically based on Conjunction (min) fuzzy rule bases. The results of firing strength can be stored into the RBS matrix;
14. In the RBS matrix, sort all FRs into groups sorted in an increasing order of the LVs of outputs; in other words a 'group' is all the FRs with the same LV as output;
15. Find a dominant rule in each group, meaning the rule with highest firing strength from each group in step 13;
16. For each group, keep the dominant rule and remove any other rules;
17. For the reduced rule base, apply the implication, the aggregation and the defuzzification through interface 124 to generate a current output value;
18. Repeat step 11 to step 17 for each point to generate output values with benefit of neuro-fuzzy learning and reduced complexity appropriate to current conditions.
19. Repeat steps 9, 10 at intervals appropriate to changing conditions. This could be during a mission or at the start of a mission, for weather. It could be more frequent in other applications.

The detailed implementation is a matter for the person skilled in the art to decide. One option, described in a parallel patent application filed concurrently herewith, is to vectorise the data and inference rules, so that several data and inference rules items are processed in parallel or quasi-parallel. An application example will now be described, to aid understanding.

Health Monitoring in Networked System—detailed example

Figure 4:
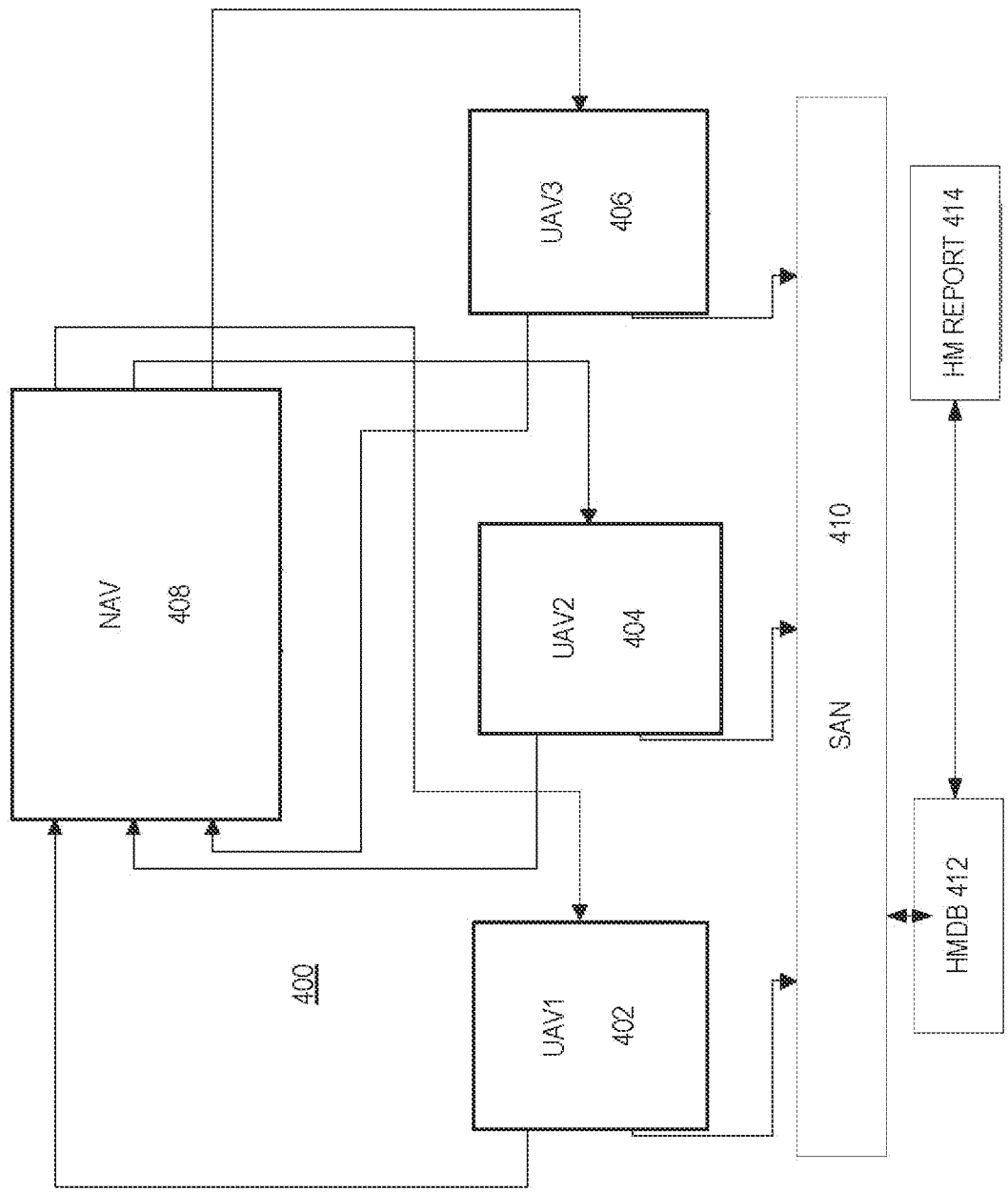
FIG. 4 illustrates an example application in which the invention is applied to help monitoring in a system of unmanned airborne vehicles (UAVs) in a shared access network (SAN) environment.

FIG. 4 illustrates in very simple form an environment in which complex health monitoring issues arise. The "system of systems" (SoS) 400 in this example includes a number of entities 402-408 including unmanned, autonomous aircraft UAV1, UAV2, UAV3 and a central navigation system NAV, communicating with one another in a shared access network (SAN) 410. Individual health information from the entities 402-408 are delivered by their on-board HM systems to the network and collected in a HM database 412. Also delivered to the database are environmental measurements and results, including weather. The health information from each entity is not raw data from the many sensors on board, but is aggregated by NFI processing in the entity into a few key indicators. The highest level of the HM system hierarchy processes the health data at 414 to deliver a high level result or results.

Figure 5:
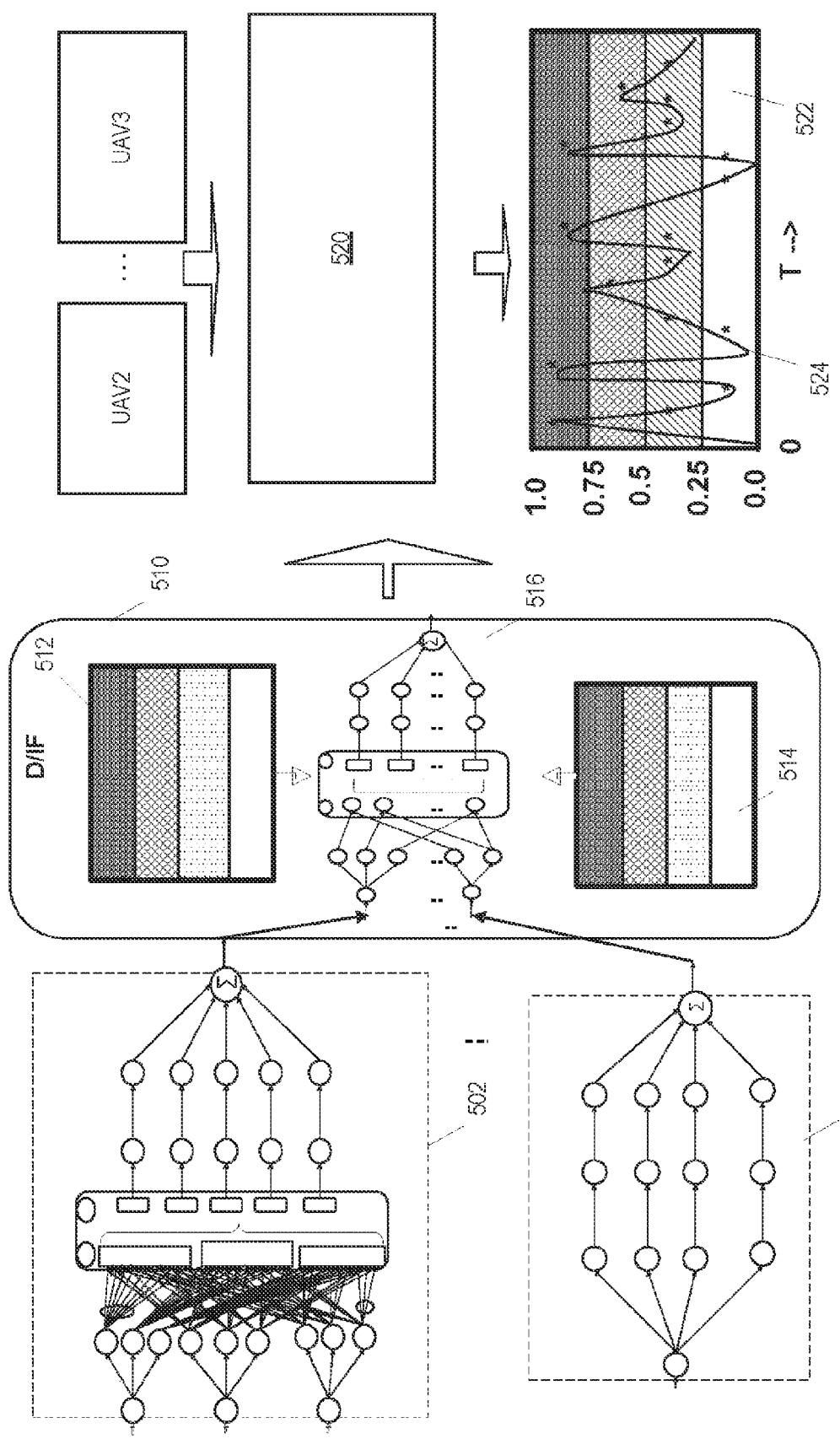
FIG. 5 illustrates the aggregation of inference results into a health monitoring result for a network of autonomous vehicles in the system of FIG. 4.

FIG. 5 shows schematically how multiple NFI-SRBO-MISO models combine to form a more powerful NFI-SRBO-MIMO model at the level of each entity, and how such data is aggregated on board the entity to produce health information as manageable inputs to higher levels, to implement the system of FIG. 4.

The first level of NFI-based health management processing in the FIG. 5 application includes a set of NFI-SRBO-MISO modules 502, 504 and others each receiving various inputs from sensors and outputting a useful result. Module 502 for example monitors airspeed as an important factor in UAV performance. Module 504 monitors fuel conditions. The detail within these modules will be described further below, with reference to FIGS. 6 and 7, respectively. In general, the inputs for these modules could be determined from sensors, the performances of the network system, uncertainly information from the environment, or human knowledge information.

The outputs of the modules 502, 504 etc. represents real-time monitoring information concerning the health of the various entities within the larger system, and is provided to a diagnostic stage 510. The airspeed result can be regarded as a single value on a performance scale 512. Similarly the fuel performance result can be regarded on another scale 514. Stage 510 performs what we call data/information fusion (D/IF) simply by using these lower-level health results as inputs to a further NFI-SRBO-MISO module 516. This and other similar modules provide their assessments of the key health parameters of the various entities to provide the failures/faults information to the third stage 520. Here, further NFI processes aggregate the lower level results until a single result or set of results representing health information of the SoS as a whole is represented on a scale 522. In terms of output linguistic values, this scale 522 might range from zero meaning called "OK" through levels such as "unstable" and "damaged" up to level 1 meaning "shutdown". At each point in time (each processing cycle) the value 524 can be reassessed and operational decisions made in reliance upon the current result. Complexity is compartmentalized by their hierarchical structure, so that the higher levels do not need to know why the vehicle or other entity is said to be unstable, damaged, etc.: only that it is.

Figure 6:
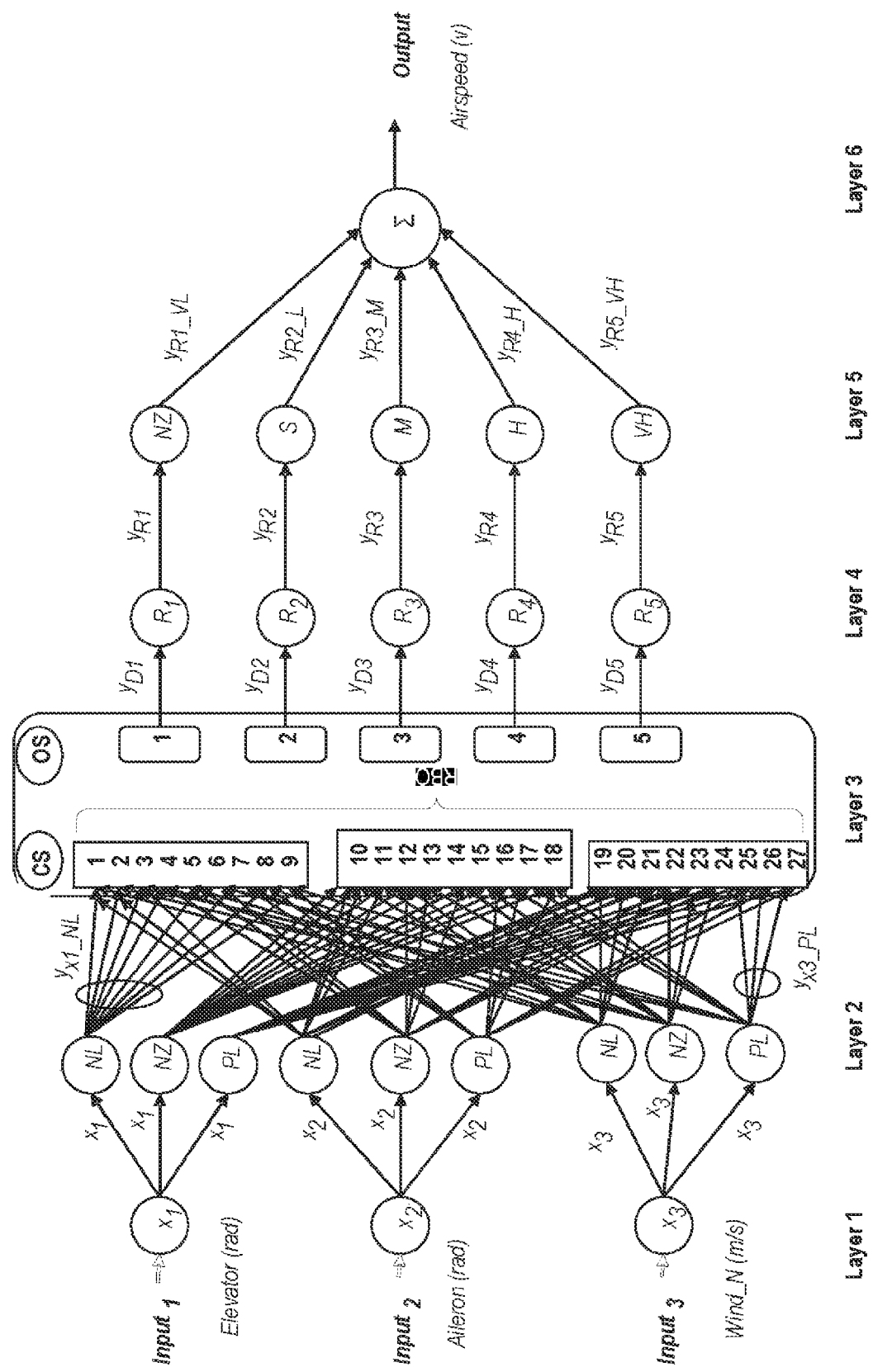
FIG. 6 illustrates a first fuzzy inference process within a UAV.

FIG. 6 shows the logical structure of the module 502 in the FIG. 5 system, which is clearly an implementation of the general NFI-SRBO-MISO model described above in relation to FIG. 3. For the UAV example, module 502 has an output representing airspeed. Input $x_1$ is elevator angle, input $x_2$ is a measurement of aileron angle and input $x_3$ is wind speed (headwind) in a particular direction. The sensors for the first two inputs are readily available. The 'wind sensor' for input $x_3$ is likely to be a combination of sensors mounted on the UAV itself. The wind speed & direction variable (uncertain variable) should be acquired by the sensors on the UAV. Values from wind sensors on the UAV will need to be compensated by GPS groundspeed to obtain relative values significant to the vehicle performance. Headquarters provides the environment (weather & terrain) information and area/target information to UAV before the mission starts, with optional updates. In a real system, headwind and crosswind values maybe separately significant and provided to the HM system as separate inputs.

In setting the membership functions and rules in this module, the values are selected according to the weather condition regime, as described further below.

Figure 7:
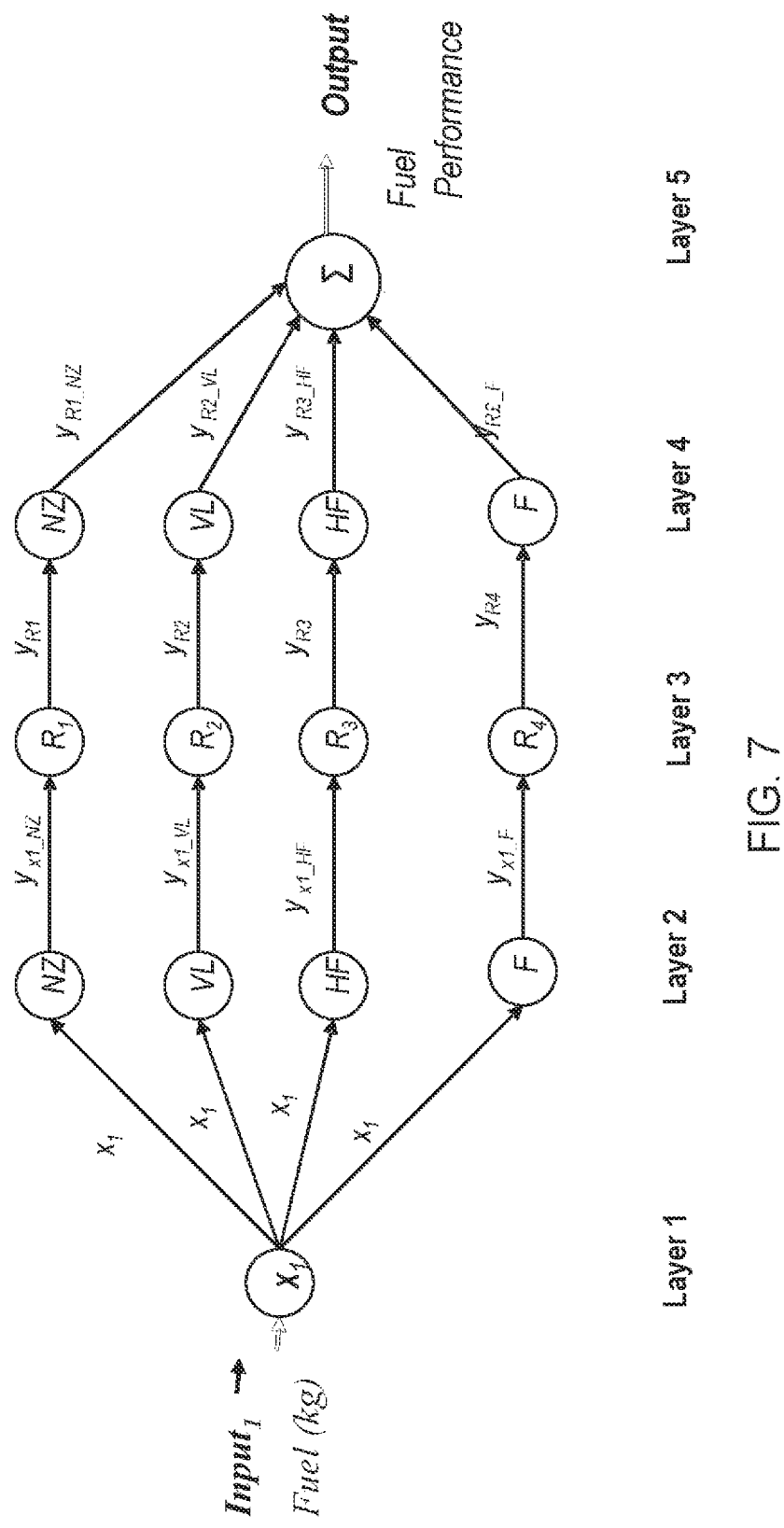
FIG. 7 illustrates a second fuzzy inference process within the same UAV.

FIG. 7 illustrates the fuzzy inference process for another module 504, which processes fuel level information from a suitable sensor and outputs fuel performance as an output. In principle, fuel level is just another input to the same general health monitoring problem as the other inputs mentioned above. From expert knowledge and/or observations in training and simulation, the designer knows that results of these outputs are only weakly interdependent. By separating this measure into its own (SISO) inference process, the designer reduces the complexity. Furthermore, the different fuzzy processes 502, 504 etc. may be repeated at very different rates, for example because fuel level varies only slowly in comparison with the aerodynamic variables, obstacle detection etc. By both these measures, the demand on real-time on-board processing hardware is greatly reduced.

As a result of the factors just described, the fuel monitoring process 504 is a simple 5-layer fuzzy inference process without online optimization. The designer can decide likewise whether it is beneficial for the membership functions and rules are to be adapted to different condition regimes in the manner described above.

Training for Different Conditions—UAV Example

Figure 8B:
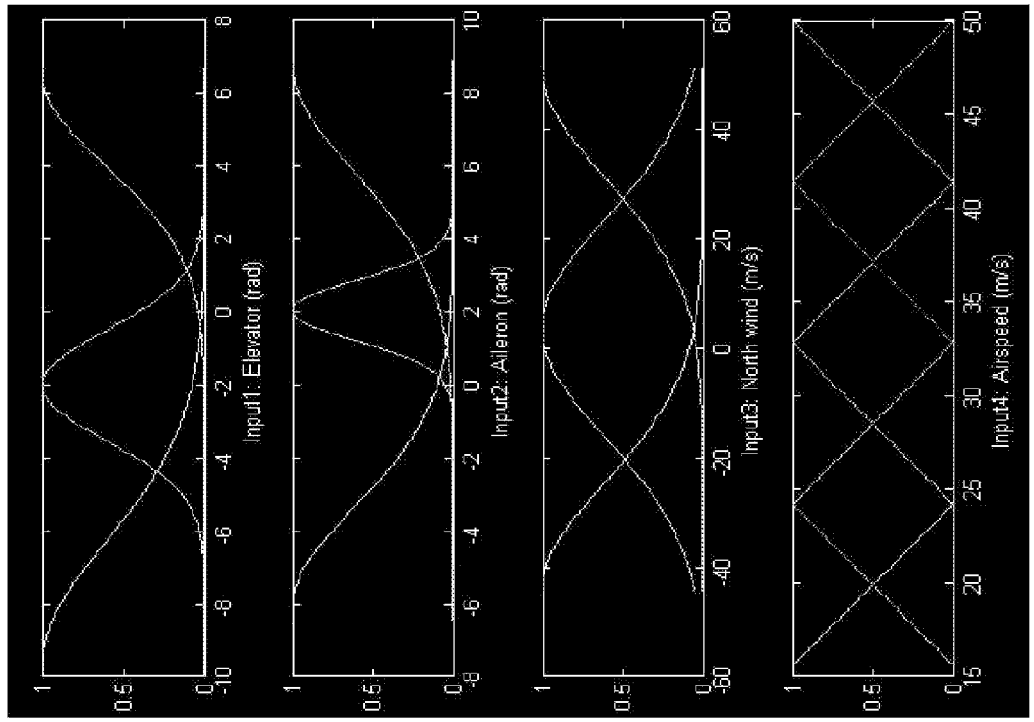
FIG. 8 illustrates (a) initial and (b) final fuzzy membership functions in the example application, trained for a "bad weather" condition.

Returning to the module 502 shown in FIG. 6, the fuzzy rules for the airspeed calculation can be learned very differently according to whether a bad weather (windy) or good weather condition is expected. FIGS. 8 and 9 and the following discussion show these differences in a small example.

Figure 8A:
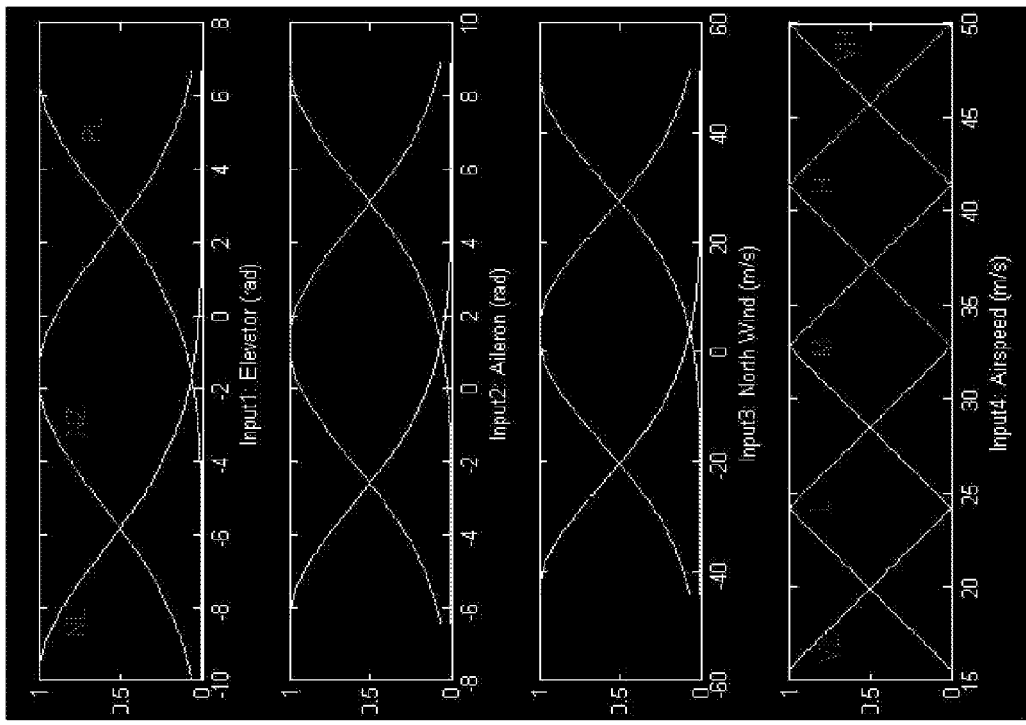

FIGS. 8(a) and (b) relate to the bad weather condition. We first define the initial conditions, and assign the membership values for the inputs and the output. Since the task is to monitor a UAV's airspeed during a mission, we define that the initial membership values for the bad weather condition are the elevator (input $x_1$) from −10 rad to 8 rad; the aileron ($x_2$) from −8 rad to 10 rad; the wind ($x_3$) from −60 m/s to 60 m/s, the fuel ($x_4$) from 5 kg to 0 kg. The output Airspeed membership value is from 18 m/s to 32 m/s. The inputs $x_1$ to $x_3$ can take the three LVs: negative large (NL=1), near zero (NZ=2), and positive large (PL=3). The fuel input $x_4$ can be near zero (NZ=4), very low (VL=3), half full (HF=2) or full (F=1). The output can take the five LVs: near zero (NZ or 1), small (S=2), medium (M=3), large (L=4) and very large (VL=5).

An established simulation model of the particular aircraft type is run and the training performed in a conventional manner. Alternatively, datasets recorded during actual flying could be used, or a combination. After the NFI learning and training of the initial MFs, the final MFs of elevator, aileron and winds will apply to the NFI-SRBO-MISO models. For training in bad weather conditions, strong winds are set up; the initial and final MFs for the elevator, the aileron and the winds are shown in FIGS. 8(a) and (b) respectively, and the final values repeated Table 1.

TABLE 1

Final MF parameters for the inputs and output (Bad weather conditions)

| I/O Name | Range | Membership Function | Final Value of MFs |
|---|---|---|---|
| Input1: Elevator | [−10 6.7] | Function: gaussmf<br>NL = 1; NZ = 2;<br>PL = 3. | [3.4 −9.7]<br>[1.5 −2]<br>[2.6 6.6] |
| Input2: Aileron | [−6.4 9] | Function: gaussmf<br>NL = 1; NZ = 2;<br>PL = 3. | [2.8 −6.2]<br>[0.8 2]<br>[3.1 8.9] |
| Input3: Winds | [−44.3 51.6] | Function: gaussmf<br>NL = 1; NZ = 2;<br>PL = 3. | [20.1 −44.4]<br>[20 3.7]<br>[20.4 51.5] |
| Input4: Fuel | [0 5] | Function: gaussmf<br>F = 1; HF = 2;<br>VL = 3; NZ = 4. | [2.5 0]<br>[1.5 4]<br>[3 5] |
| Output: Airspeed | [15.6 50] | Function: trimf<br>NZ = 1; S = 2;<br>M = 3; H = 4;<br>VL = 5. | [7 15.6 24.2]<br>[15.6 24.2 32.8]<br>[24.2 32.8 41.4]<br>[32.8 41.4 50]<br>[41.4 50 58.1] |

Training is then repeated with 'perfect' weather conditions (a light wind is set up rather than zero wind, so that the functions have something to respond to). We first define the initial conditions, and assign the membership values for the inputs $x_1$, $x_2$, $x_3$, $x_4$ and the output $o_{N1}$. Since the task is to monitor a UAV's airspeed during a mission, we define that the initial membership values for the perfect weather condition are the elevator ($x_1$) from −1.5 rad to 1 rad; the aileron ($x_2$) from −5 rad to 1 rad; the wind ($x_3$) from −1 m/s to 1 m/s, the fuel ($x_4$) from 5 kg to 0 kg. These initial values are different from those input for the bad weather training, and reflect human expert knowledge and/or previous training experience, which says that the control surfaces of the aircraft will be subject to milder actuations in light weather, compared with bad weather. The output Airspeed membership value is from 18 m/s to 32 m/s. The inputs $x_1$, $x_2$ and $x_3$ can take the three LVs: negative large (NL=1), near zero (NZ=2), and positive large (PL=3). The output can take the five LVs: near zero (NZ=1), small (S=2), middle (M=3), large (L=4) and very large (VL=5). MFs for the inputs are Gaussian, while the output MFs are triangular in the normal fashion.

The initial and final MFs are shown in FIG. 9(a) and (b) respectively, and the final MFs are shown in more detail in Table 2 below.

TABLE 2

Final MF parameters for the inputs and output (Perfect weather condition)

| I/O Name | Range | Membership Function | Final Value of MFs |
|---|---|---|---|
| Input1: Elevator | [−1.05 0.79] | Function: gaussmf<br>NL = 1; NZ = 2;<br>PL = 3. | [0.35 −0.87]<br>[0.28 −0.36]<br>[0.33 0.67] |
| Input2: Aileron | [−4.78 0.45] | Function: gaussmf<br>NL = 1; NZ = 2;<br>PL = 3. | [1.11 −4.78]<br>[1.13 −2.11]<br>[1.07 0.52] |
| Input3: Winds | [−0.75 0.25] | Function: gaussmf<br>NL = 1; NZ = 2;<br>PL = 3. | [0.155 −075]<br>[0.076 −0.24]<br>[0.168 0.22] |
| Input4: Fuel | [0 5] | Function: gaussmf<br>F = 1; HF = 2;<br>VL = 3; NZ = 4. | [2.5 0]<br>[1.5 4]<br>[3 5] |
| Output1: Airspeed | [26.87 31.05] | Function: trimf<br>NZ = 1; S = 2;<br>M = 3; H = 4;<br>VL = 5. | [25.83 26.87 27.9]<br>[26.87 27.92 28.97]<br>[27.92 28.99 29.89]<br>[28.98 30.01 31.04]<br>[30.01 31.03 32.09] |

Comparing these graphs from a distance, we see already some differences in the MF shapes. Reviewing the scales on the graphs and the numerical values in the tables, however, the difference in the MF ranges becomes very clear. Thus, for example, training confirms that, in bad weather, a wind beyond 20 m/s might be regarded as large, but not, say 0-10 m/s. Elevator settings plus or minus several rads are to be expected in bad weather flying, but even a fractional adjustment could be regarded as large in good weather. At the output side, the aircraft is expected to control its airspeed very close to the nominal speed of around 29 m/s, but in bad weather, much wider variations are expected.

In each regime, the simulation results show a very good agreement between the 'actual' airspeed and that predicted or 'measured' by the NFI health monitoring model. Qualitatively, at least, these differences illustrate that, while such accuracy of modelling can be obtained with only a few LVs per variable in the bad weather regime or the good weather regime, the LV membership functions are very different between the two ranges. Accordingly, one must expect that, to obtain similar accuracy with a single set of fuzzy MFs and rules across both weather regimes would require, a wider number and range of LVs per input would be required, and hence a very much greater complexity.

Accordingly, we propose that performance of NFI systems can be improved and complexity reduced at the same time, by providing multiple fuzzy rule bases for a single inference task, each appropriate to a different set of environmental or similar conditions. Great benefit can thus be obtained by training the NFI system with data sets specific to each condition regime, and then arranging that information from sensors or other sources will be used to influence the selection of the knowledge base appropriate to the conditions prevailing during operation.

Training would also confirm that the fuel level has negligible input on the airspeed, certainly over short timescales, and so the exclusion of the fourth input from the airspeed calculation is justified.

Figure 10:
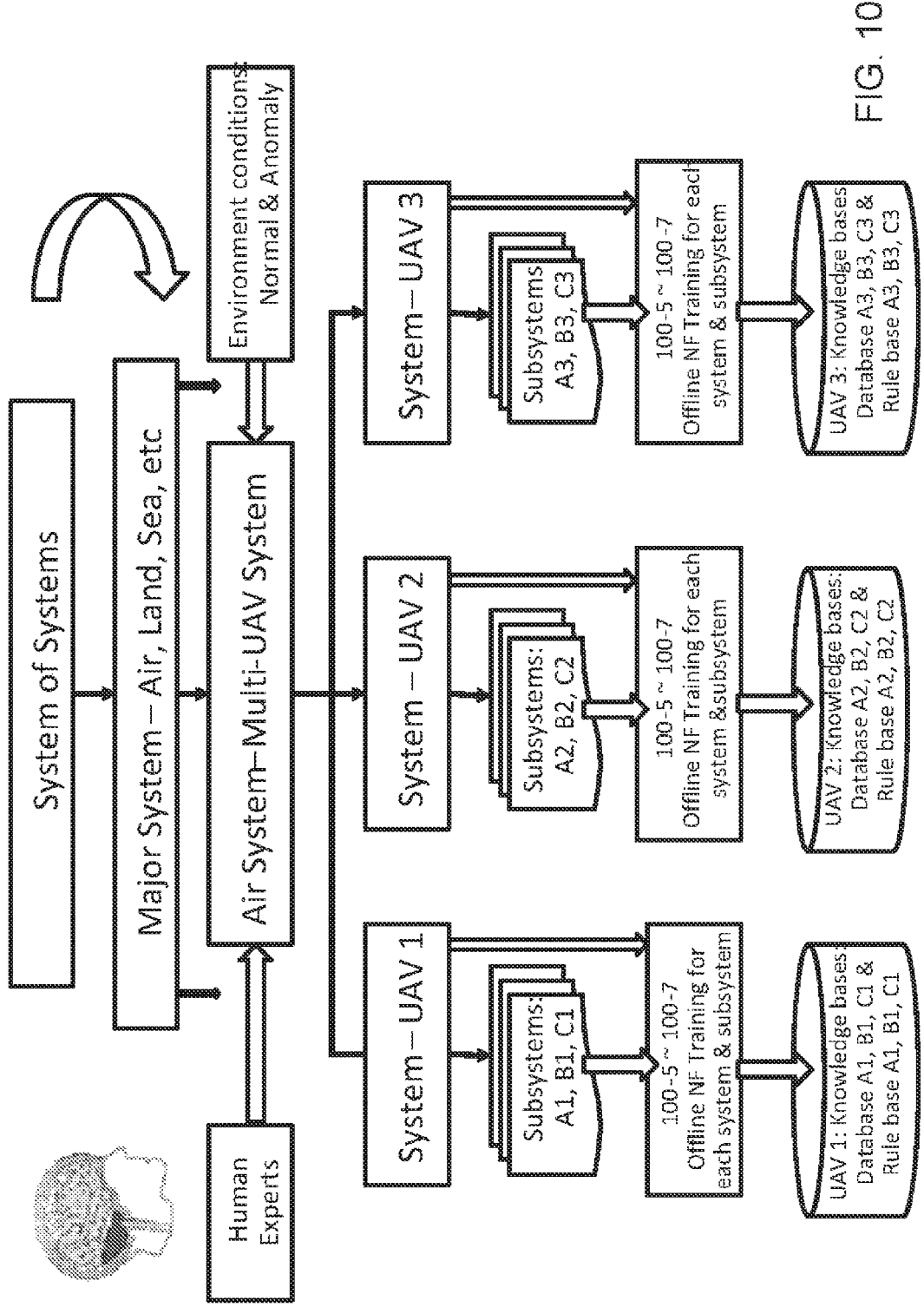
FIG. 10 illustrates the application of the architecture of FIG. 1 in the context of a system of unmanned vehicles of the type shown in FIG. 4.

FIG. 10 shows the neuro-fuzzy learning architecture of FIG. 1 applied to the multi-UAV system in a networked environment which may also include land and sea vehicles and other elements. Each vehicle UAV1-UAV3 has knowledge bases for assessing the health of its respective subsystems A1, B1, C1 etc. These knowledge bases, databases and rule bases correspond to the elements 126, 128 and 130 in FIG. 1. Within the knowledge base for any of these subsystems, there may be different parallel databases and/or rule bases, for use in different operating conditions.

The databases are derived as described already, by reference to both human expert knowledge and training data. Typically the expert knowledge will provide the rule bases, while the training data provides the databases of membership functions, as explained already above. The training steps 100-5 to 100-7 of FIG. 1 are represented in FIG. 10 as the source of the databases. As explained above, training data is obtained from real or simulated experience in what may be called 'normal' conditions and one or more types of 'anomaly' conditions. Rather than provide training data for all conditions to obtain a single database, different databases are trained for use in the different conditions. A database obtained by training with anomaly condition data, such as the 'bad weather' condition mentioned in the examples of FIGS. 8 and 9, can be used for the fuzzy inferences when corresponding anomaly conditions are experienced in real time (online) operation.

Detailed information on how the training data and rule bases may be obtained is not provided here. The papers mentioned in the introduction provide further background and guidance on this topic, and their contents are hereby incorporated by reference:

1. "Knowledge-elicitation and data-mining: Fusing human and industrial plant information" by W. Browne, L. Yao, I. Postlethwaite, S. Lowes, M. Mar, Engineering Applications of Artificial Intelligence 19 (2006) 345-359.

2. "Design, implementation and testing of an intelligent knowledge-based system for the supervisory control of a hot rolling mill" by L. Yao, I. Postlethwaite, W. Browne, D. Gu, M. Mar, S. Lowes, Journal of Process Control 15 (2005) 615-628.

Both papers are published by Elsevier. These papers describe application to a controller in complex industrial plant, specifically plate rolling mills. However, the principles of combining expert knowledge and learning based on empirical data are applicable in the health-monitoring systems that are subject of the present application. In the first reference, sections 3 and 4 are particularly relevant. In the second reference, section 4.2 is particularly relevant.

CONCLUSION

The above description presents the principles of the invention in various aspects together with a number of embodiments and variations of embodiments by which those principles can be implemented. The skilled reader will appreciate that these and other variations and modifications are possible to suit different applications and design criteria, without departing from the spirit or scope of the invention as defined in the appended claims.

What is claimed is:

1. A fuzzy inference apparatus comprising:
a plurality of inputs for receiving time-varying input signals;
at least one output for outputting a time-varying output signal dependent on the input signals; and
a processing apparatus configured to:
perform, on the time-varying input signals, a fuzzification process, thereby providing fuzzified data, the fuzzification process being performed in accordance with fuzzy membership functions contained within a knowledge base; and
perform, on the fuzzified data, fuzzy inference to generate the output signal, the fuzzy inference being performed in accordance with fuzzy inference rules contained within the knowledge base; wherein
the knowledge base comprises fuzzy membership functions and fuzzy inference rules, the fuzzy membership functions and fuzzy inference rules having been defined in advance;
the knowledge base comprises at least two alternative definitions of the membership functions and inference rules, and the processing apparatus is operable to apply different ones of the definitions at different times; and
the processing apparatus is arranged to optimize its fuzzy rule set automatically during operation, between fuzzification of the input signals and completion of the fuzzy inference.

2. An apparatus as claimed in claim 1, in combination with a monitoring system for a monitored apparatus, the output signal representing a measure of health of the monitored apparatus.

3. An apparatus as claimed in claim 2, wherein the inference apparatus and the monitored apparatus are housed together as one unit, together with a communications interface for delivering the output signal via the communications interface to a remote apparatus.

4. An apparatus as claimed claim 2, wherein the monitored apparatus comprises:
a plurality of subsystems, wherein the inference apparatus is part of a hierarchy of inference apparatuses monitoring the subsystems, the hierarchy including a higher-level inference apparatus arranged to receive, as inputs, outputs of lower-level inference apparatuses monitoring respective subsystems, and wherein at least one of the lower-level and higher-level inference apparatuses has the knowledge base comprising alternative definitions.

5. An apparatus as claimed in claim 1, comprising:
a selector for selecting which definition to use automatically in response to selection criteria specifying ranges of operating conditions in which each definition is used.

6. An apparatus as claimed in claim 5, wherein the selection criteria define ranges of operating conditions by reference at least partially to externally received signals.

7. An apparatus as claimed in claim 6, wherein the selection criteria define ranges of operating conditions at least partially by references to certain of the input signals.

8. An apparatus as claimed claim 1, wherein the alternative definitions comprise:
a first definition for normal operating conditions and one or more further definitions for anomalous operating conditions.

9. An apparatus as claimed in claim 1, wherein the apparatus is responsive to an externally supplied selection signal, commanding application of a particular definition.

10. An apparatus as claimed in claim 1, wherein the apparatus is responsive to a selection value loaded into memory prior to operation.

11. An apparatus as claimed in claim 1, wherein the processing apparatus is arranged to optimize a fuzzy rule set automatically during operation, between fuzzification of the input signals and completion of a fuzzy inference.

12. A distributed data processing system for monitoring a condition of a system of discrete apparatuses over time, the monitoring system comprising:
a hierarchy in which a higher level monitoring apparatus is supplied with input signals from a plurality of lower level monitoring apparatus, each lower level monitoring apparatus comprising one or more fuzzy inference apparatuses for processing a plurality of input signals relating to its respective monitored apparatus and for generating an output signal representing the condition of its monitored apparatus; and
the higher level monitoring apparatus comprising at least one fuzzy inference apparatus for receiving as inputs the output signals of plural lower level monitoring apparatuses, and for generating a higher level output signal representing the condition of the system of discrete apparatuses as a whole, wherein the at least one fuzzy inference apparatus is an apparatus as claimed in claim 1.

13. A distributed processing system as claimed in claim 12, wherein at least one of the monitored apparatuses is an unmanned autonomous vehicle.

14. A computer program product containing instructions for causing a programmable processing apparatus to implement functions of the processing apparatus of a fuzzy inference apparatus as claimed in claim 1.

15. The computer program product of claim 14, comprising:
the knowledge base including the alternative definitions.

16. The computer program product of claim 14, comprising:
a definition of selection criteria to be applied automatically for selection between the alternative definitions.

17. A method of generating a time-varying output signal in response to a plurality of time-varying input signals, the method comprising:
(a) storing in a processing apparatus a knowledge base comprising definitions of membership functions for the input and output signals and fuzzy inference rules for use in fuzzy inference processing;
(b) receiving the input signals; and
(c) operating the processing apparatus to:
perform, on the time-varying input signals, a fuzzification process, thereby providing fuzzified data, the fuzzification process being performed in accordance with fuzzy membership functions contained within the knowledge base; and
generate the time-varying output signal by performing fuzzy inference processing on the fuzzified data, the fuzzy inference being performed in accordance with the fuzzy inference rules stored in the knowledge base;
wherein step (a) includes storing at least two alternative definitions of the membership functions and inference rules, and step (c) includes making a selection between the alternative definitions so as to perform the inference processing using different definitions at different times; and
the processing apparatus is arranged to optimize its fuzzy rule set automatically during operation, between fuzzification of the input signals and completion of the fuzzy inference.

18. A method as claimed in claim 17, wherein the step (a) comprises:
generating the knowledge base by a training process using a training data, representing potential input signals and desired output signals, the different definitions being a result of training using different subsets of the training data.

19. A method as claimed in claim 18, wherein the different subsets of training data include some data common to both subsets.

20. A method as claimed in claim 18, wherein a first subset of training data is selected to represent normal operating conditions while one or more further subsets representing anomalous conditions expected to arise relatively infrequently during operation of the method.

21. A method as claimed in claim 17, comprising:
producing the output signal based on input signals used to monitor the health of another apparatus with which the processing apparatus is associated.

22. A method as claimed in claim 17, wherein the step (a) comprises:
storing selection criteria specifying ranges of operating conditions in which each definition is used, the selection in step (c) then being made automatically in response to changes detected in operating conditions.

23. A method as claimed in claim 22, wherein the selection criteria define ranges of operating conditions by reference to externally received signals, to certain of the input signals already received as inputs or to a combination of these.

24. A method as claimed in claim 17, wherein the selection is made in response to an externally supplied selection signal, commanding application of a particular definition.

25. A method as claimed in claim 17, wherein the selection is made by a selection value loaded into memory prior to operation.

26. An automated method of distributed data processing for monitoring a condition of a system of discrete apparatuses over time, the method comprising:
- establishing and operating a hierarchy of monitoring apparatuses in which a higher level monitoring apparatus is supplied with input signals from a plurality of lower level monitoring apparatus;
- in each lower level monitoring apparatus operating one or more fuzzy inference apparatuses to process a plurality of input signals relating to its respective monitored apparatus and generate an output signal representing the condition of its monitored apparatus; and
- in the higher level monitoring apparatus, operating at least one fuzzy inference processor to receive as inputs the output signals of plural lower level monitoring apparatuses, and to generate a higher level output signal representing the condition of the system of discrete apparatuses as a whole,
- wherein at least one of the fuzzy inference apparatuses is an apparatus performing a method as claimed in claim 17.

27. A method as claimed in claim 26, wherein at least one of the monitored apparatuses is an unmanned autonomous vehicle.

28. A computer program product containing instructions for causing a programmable processing apparatus to implement a method as claimed in claim 17.

* * * * *